United States Patent
Ren et al.

(10) Patent No.: US 11,682,231 B2
(45) Date of Patent: Jun. 20, 2023

(54) LIVING BODY DETECTION METHOD AND DEVICE

(71) Applicant: Hangzhou Hikvision Digital Technology Co., Ltd., Zhejiang (CN)

(72) Inventors: Zhihao Ren, Zhejiang (CN); Congyi Hua, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 59 days.

(21) Appl. No.: 17/416,744

(22) PCT Filed: Dec. 16, 2019

(86) PCT No.: PCT/CN2019/125608
§ 371 (c)(1),
(2) Date: Jun. 21, 2021

(87) PCT Pub. No.: WO2020/135125
PCT Pub. Date: Jul. 2, 2020

(65) Prior Publication Data
US 2022/0044039 A1 Feb. 10, 2022

(30) Foreign Application Priority Data

Dec. 27, 2018 (CN) .......................... 201811608283.2

(51) Int. Cl.
*G06V 40/16* (2022.01)
*G06T 7/50* (2017.01)
(Continued)

(52) U.S. Cl.
CPC .............. *G06V 40/168* (2022.01); *G06T 7/50* (2017.01); *G06V 10/50* (2022.01); *G06V 40/169* (2022.01);
(Continued)

(58) Field of Classification Search
CPC ...... G06V 40/45; G06V 10/50; G06V 40/169; G06V 40/168; G06V 20/64; G06V 40/161;
(Continued)

(56) References Cited

U.S. PATENT DOCUMENTS

2005/0180627 A1* 8/2005 Yang .................. G06V 30/2504
382/118
2012/0076361 A1* 3/2012 Fujiyoshi ............. G06V 40/103
382/103
(Continued)

FOREIGN PATENT DOCUMENTS

| CN | 105335722 A | 2/2016 |
|---|---|---|
| CN | 105631439 A | 6/2016 |

(Continued)

OTHER PUBLICATIONS

Kong, Y., et al., "Three-dimensional face living body recognition method and device", English Machine Translation of CN105740775A (published Jul. 6, 2016).*

*Primary Examiner* — Xuemei G Chen
(74) *Attorney, Agent, or Firm* — Bret E. Field; Bozicevic, Field & Francis LLP (57) ABSTRACT

A living body detection method and device are disclosed. Wherein the method comprises the following steps: extracting valid depth data of a target detection object from depth map data containing the target detection object; generating a depth difference histogram based on the valid depth data; and inputting the depth difference histogram into a pre-trained machine learning classifier to obtain a determination result of whether the target detection object is a living body. By adopting this method, the detection accuracy can be improved.

15 Claims, 4 Drawing Sheets (51) Int. Cl.
*G06V 10/50* (2022.01)
*G06V 40/40* (2022.01)

(52) U.S. Cl.
CPC .... *G06V 40/45* (2022.01); *G06T 2207/20021* (2013.01); *G06T 2207/20081* (2013.01); *G06T 2207/20224* (2013.01)

(58) Field of Classification Search
CPC ............. G06T 7/50; G06T 2207/20021; G06T 2207/20081; G06T 2207/20224
See application file for complete search history.

(56) References Cited

U.S. PATENT DOCUMENTS

| | | | | |
|---|---|---|---|---|
| 2012/0249746 | A1* | 10/2012 | Cornog | G06T 7/97 348/46 |
| 2014/0139633 | A1* | 5/2014 | Wang | H04N 7/18 348/46 |
| 2014/0184569 | A1* | 7/2014 | Lee | G06F 3/042 345/175 |
| 2014/0218365 | A1* | 8/2014 | Ha | G06T 15/506 345/426 |
| 2016/0275695 | A1* | 9/2016 | Luczak | G06V 20/52 |
| 2016/0370570 | A1* | 12/2016 | Foelling | G02B 27/0025 |
| 2018/0150704 | A1* | 5/2018 | Lee | G06V 10/50 |
| 2018/0189556 | A1* | 7/2018 | Shamir | G06T 7/269 |
| 2018/0247134 | A1* | 8/2018 | Bulzacki | G07F 17/3239 |
| 2018/0260616 | A1* | 9/2018 | Spinoulas | G06V 10/50 |
| 2018/0373927 | A1* | 12/2018 | Yang | G06V 10/25 |
| 2019/0026588 | A1* | 1/2019 | Ryan | G05D 1/0088 |
| 2019/0226853 | A1* | 7/2019 | Kubiak | G01C 21/3811 |
| 2020/0151425 | A1* | 5/2020 | Zhou | H04N 5/33 |
| 2020/0320749 | A1* | 10/2020 | Vlachomitriou | G06T 7/50 |

FOREIGN PATENT DOCUMENTS

| | | |
|---|---|---|
| CN | 105740775 A | 7/2016 |
| CN | 107066942 A | 8/2017 |
| CN | 107292252 A | 10/2017 |
| CN | 107509024 A | 12/2017 |
| CN | 108256459 A | 7/2018 |
| CN | 108446675 A | 8/2018 |
| CN | 108616688 A | 10/2018 |

* cited by examiner

LIVING BODY DETECTION METHOD AND DEVICE

The present application claims the priority to a Chinese patent application No. 201811608283.2, filed with the China National Intellectual Property Administration on Dec. 27, 2018 and entitled "LIVING BODY DETECTION METHOD AND DEVICE", which is incorporated herein by reference in its entirety.

TECHNICAL FIELD

The present application relates to the field of digital image processing technology, and in particular to a living body detection method and device.

BACKGROUND

With the increasing popularity of face recognition technology in the field of public consumption, the threat of the impersonation attacks to a face authentication system is also increasing. The impersonation attacks have a very unfavorable effect on the security application of the face authentication system. Therefore, the face living body detection technology, which can also be called a face presentation attack detection technology, has been attracted more and more attention.

The existing face living body detection technology can be roughly divided into two types according to the space dimension, wherein one type is two-dimensional face living body detection, and the other type is three-dimensional face living body detection. The two-dimensional face living body detection adopts technical means including texture analysis, background analysis, illumination model analysis, motion analysis, interactive determination and the like. The method of determining whether the face is a living body by requiring a subject to be verified to make a real-time response meeting the requirements through human-machine interaction is widely applied in practice. In addition, with the popularization of a near infrared imaging device and a thermal infrared imaging device, the two-dimensional face living body detection has been more widely used. Essentially, this type of method relies on an illumination model of the face illuminated by light sources with different wavelengths to determine whether it belongs to a living body.

As three-dimensional face recognition gradually enters the public's field of vision, correspondingly, the three-dimensional face living body detection technology has also been widely concerned.

Currently, a three-dimensional face living body detection scheme is disclosed which determines whether the three-dimensional face image comes from a living body based on the actual curvature of multiple feature points used in the three-dimensional face image.

The inventor finds that the three-dimensional human face living body detection scheme has problems in efficiency, accuracy, stability and the like. The specific reason is analyzed as follows.

In the above-mentioned three-dimensional face living body detection scheme, it takes a long time for curvature calculation, and only the depth information near a part of feature points in the three-dimensional face image is extracted during curvature calculation, which wastes the global information of the three-dimensional face image, which is the bottleneck for improving the accuracy. In addition, in the above-mentioned three-dimensional face living body detection scheme, only a threshold is set to distinguish a living body from a non-living body, which can also limit the accuracy of the face living body detection.

SUMMARY

In view of this, the main object of the present application is to provide a living body detection method and device, which can improve the accuracy of detection.

In order to achieve the above object, an embodiment of the present application proposes a living body detection method, including:

extracting valid depth data of a target detection object from depth map data containing the target detection object;

generating a depth difference histogram based on the valid depth data;

inputting the depth difference histogram into a pre-trained machine learning classifier to obtain a determination result of whether the target detection object is a living body.

Optionally, the step of extracting valid depth data of a target detection object from the depth map data containing the target detection object includes:

extracting the depth data of the target detection object from the depth map data of the target detection object in a manner of image segmentation according to a preset depth difference range;

determining whether the angle of the extracted depth data on each coordinate plane of a three-dimensional coordinate system is within the preset angle range; if so, taking the extracted depth data as the valid depth data of the target detection object; otherwise, determining the extracted depth data as invalid depth data of the target detection object;

wherein an xy plane of the three-dimensional coordinate system is parallel to a plane where a sensor of the image capturing device for acquiring the depth map data is located, and the z-axis of the three-dimensional coordinate system is the main optical axis of the image capturing device.

Optionally, when the target detection object is a face, the depth difference range is a value range of the distance between a reference plane and a pixel in a region where the face is located in the depth map data; the reference plane is a plane perpendicular to the z-axis and passing through a reference point; when the face directly faces the image capturing device, the reference point is a nose tip of the face, and when the face does not directly face the image capturing device, the reference point is a point in the face closest to the image capturing device.

Optionally, the depth difference range is from 0 to 255 mm, the depth value accuracy is 1 mm, and the preset angle range is from −15° to +15°.

Optionally, the step of generating a depth difference histogram based on the valid depth data comprises:

selecting the valid depth data in a preset sub-region from the valid depth data; wherein the preset sub-region is included in the region where the target detection object is located;

calculating the depth difference from each pixel in the preset sub-region to a reference plane based on the selected valid depth data; wherein, the reference plane is a plane passing through a reference point and perpendicular to a main optical axis of an image capturing device for acquiring the depth map data, and the reference point is a point in the target detection object closest to the image capturing device;

performing histogram statistics and then normalization processing based on the depth difference to obtain the depth difference histogram.

Optionally, the step of selecting valid depth data in a preset sub-region from the valid depth data includes:

dividing the region where the target detection object is located into several region blocks according to a preset region block division rule; and extracting valid depth data of all the region blocks in the preset sub-region from the valid depth data.

Optionally, the preset sub-region is located in the middle of the preset detection region.

Optionally, the machine learning classifier is a Support Vector Machine (SVM) classifier or a neural network classifier including multiple hidden layers.

In order to achieve the above object, an embodiment of the present application further provides a living body detection device, including a processor configured for:

extracting valid depth data of a target detection object from depth map data containing the target detection object;

generating a depth difference histogram based on the valid depth data;

and inputting the depth difference histogram into a pre-trained machine learning classifier to obtain a determination result of whether the target detection object is a living body.

Optionally, the processor is specifically configured for:

extracting depth data of the target detection object from depth map data containing the target detection object in a manner of image segmentation according to a preset depth difference range;

determining whether the angle of the extracted depth data on each coordinate plane of a three-dimensional coordinate system is within a preset angle range; if so, taking the extracted depth data as the valid depth data of the target detection object; otherwise, determining the extracted depth data as invalid depth data of the target detection object;

wherein an xy plane of the three-dimensional coordinate system is parallel to a plane where a sensor of image capturing device for acquiring the depth map data is located, the z-axis of the three-dimensional coordinate system is the main optical axis of the image capturing device, and the image capturing device is arranged in the living body detection device or independently arranged outside the living body detection device.

Optionally, when the target detection object is a face, the depth difference range is a value range of a distance between a reference plane and a pixel in a region where the face is located in the depth map data, the reference plane is a plane perpendicular to the z-axis and passing through a reference point; when the face directly faces the image capturing device, the reference point is the nose tip of the face, and when the face does not directly face the image capturing device, the reference point is a point in the face closest to the image capturing device.

Optionally, the depth difference range is from 0 to 255 mm, the depth value accuracy is 1 mm, and the preset angle range is from −15° to +15°.

Optionally, the processor is specifically configured for:

selecting the valid depth data in a preset sub-region from the valid depth data; wherein the preset sub-region is included in the region where the target detection object is located;

calculating the depth difference from each pixel in the preset sub-region to a reference plane based on the selected valid depth data; wherein, the reference plane is a plane passing through a reference point and perpendicular to a main optical axis of an image capturing device for acquiring the depth map data, and the reference point is a point in the target detection object closest to the image capturing device;

performing histogram statistics and then normalization processing based on the depth difference to obtain the depth difference histogram.

Optionally, the processor is specifically configured for:

dividing the region where the target detection object is located into several region blocks according to a preset region block division rule; and extracting valid depth data of all the region blocks in a preset sub-region from the valid depth data.

Optionally, the preset sub-region is located in the middle of the region where the target detection object is located.

Optionally, the machine learning classifier is an SVM classifier or a neural network classifier including multiple hidden layers.

In order to achieve the above object, the embodiment of the present application further discloses a non-transitory computer-readable storage medium, which stores instructions that, when executed by a processor, cause the processor to perform the steps of the living body detection method as described above.

In order to achieve the above object, an embodiment of the present application further discloses an electronic device, which includes the aforementioned non-transitory computer-readable storage medium, and a processor that can access the non-transitory computer-readable storage medium.

In order to achieve the above object, the present application further discloses a computer-executable instruction that, when executed by a processor, causes the processor to perform the steps of the living body detection method as described above.

To sum up, in the living body detection method and device proposed in the embodiments of the present application, the valid depth data of the preset detection region is extracted from the depth map data of a target detection object; the depth difference histogram is generated based on the valid depth data; and finally, it is determined whether the image corresponding to the target detection object comes from a living body based on the depth difference histogram and the pre-trained machine learning classifier. According to the scheme, the living body detection is determined by using the machine learning training mode combined with the depth information of the preset detection region. On the one hand, living body images, photographs and images in videos (LCD/OLED displayers and mobile phones) can be validly distinguished, the living body detection accuracy is improved. On the other hand, there is no need to calculate the curvature, which can greatly reduce the algorithm overhead and improve the living body detection efficiency.

DETAILED DESCRIPTION

To make the objects, technical solutions and advantages of the present application more apparent, the present application will be further described in detail below with reference to the accompanying drawings and specific embodiments.

Figure 1:
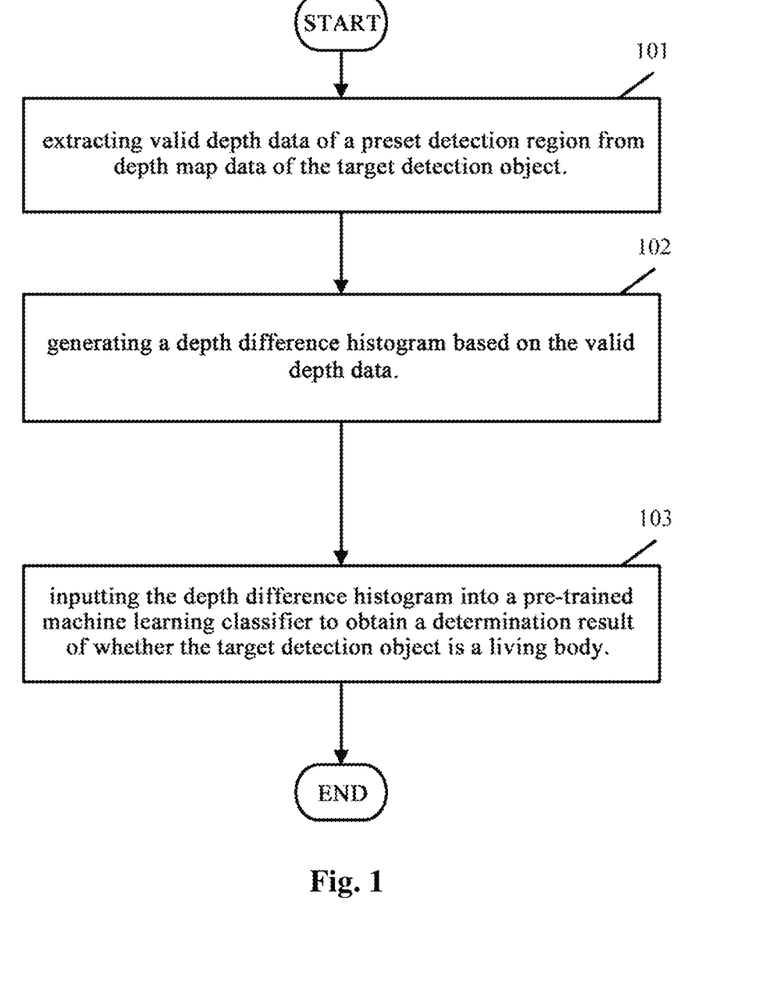
FIG. 1 is a schematic flow chart of a living body detection method provided by an embodiment of the present application.

FIG. 1 is a schematic flow chart of a living body detection method provided by an embodiment of the present application. As shown in FIG. 1, the living body detection method according to this embodiment mainly includes the following steps.

Step 101, extracting valid depth data of a preset detection region from depth map data of a target detection object.

In the above step 101, valid depth data of a target detection object is extracted from depth map data containing the target detection object. The above-mentioned preset detection region is an region where a target detection object is located. The valid depth data of the target detection object is the valid depth data of the region where the target detection object is located.

In practical applications, those skilled in the art can set a specific target detection object according to actual needs. The target detection object may be a face or a part of another living body that needs to be detected, which is not described herein again.

Optionally, in this step, the following method may be adopted to extract the valid depth data of the target detection object from the depth map data containing the target detection object:

Step 1011, extracting the depth data of the target detection object from the depth map data containing the target detection object in a manner of image segmentation according to a preset depth difference range.

In this step, in order to ensure the validity of the image data used for living body detection, reduce the unnecessary image data involved in the living body detection and determination, and improve the processing efficiency, it is necessary to extract, from the depth map data including the target detection object, the valid depth data of the target detection object that can be used for living body detection, and delete invalid depth data of the target detection object. Wherein the depth map data is image data of the depth map.

Figure 2:
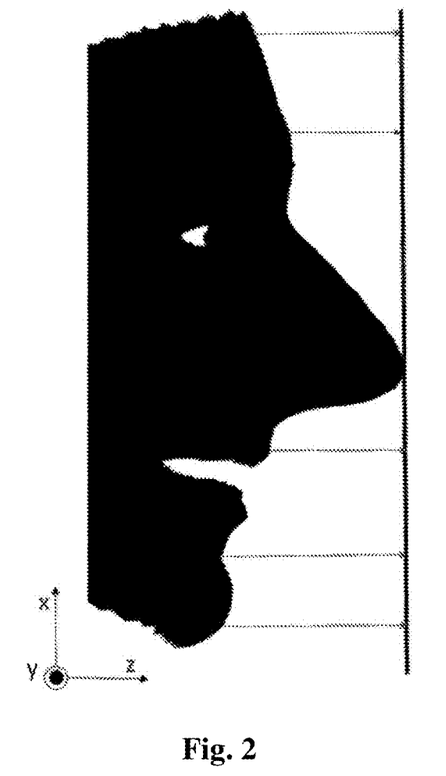
FIG. 2 is a schematic diagram of a side view of face depth data provided by an embodiment of the present application.

The object processed in the present embodiment is the depth map data. The depth map data, which is provided using the currently mainstream binocular vision-based three-dimensional reconstruction methods, Time-of-Flight (ToF)-based three-dimensional reconstruction methods, structured light-based three-dimensional reconstruction methods and the like, can be taken as objects processed in the present embodiment. The three-dimensional coordinate system referred to in this embodiment is shown in FIG. 2, in which a plane, which is parallel to the plane where a sensor of an image capturing device that captures depth map data is located, is taken as an xy plane, and the main optical axis of the camera of the image capturing device (i.e., a direction perpendicular to the plane where the sensor is located) is taken as a z-axis. Since the depth map data provided by the image capturing device includes the valid depth data (the depth data of the target detection object) and the invalid depth data (the depth data of a background object), image segmentation is performed firstly to extract the depth data of the target detection object.

A depth map has obvious region block features, does not have complex background information, and has a simpler segmentation process when compared with a common Red Green Blue (RGB) image, thus many image segmentation methods can be selected to specifically implement this step (step 1011). Methods such as threshold segmentation, edge segmentation, histogram segmentation, etc. may be used to implement step 1011, which is not specifically limited herein. By means of image segmentation, the length and width ranges of the depth data of the target detection object on the xy plane can be determined.

In an optional embodiment, the depth difference range is the value range of the distance between a reference plane and a pixel in the region where the target detection object is located in the depth map data, the depth difference is the distance between a reference plane and a pixel in the region where the target detection object is located, and the reference plane is a plane perpendicular to the z-axis and passing through a reference point. When the target detection object is a face of a living being, if the face directly faces the image capturing device, the reference point is the nose tip of the face, as shown in FIG. 2; if the face does not directly face the image capturing device, the reference point is a point in the face closest to the image capturing device.

In an optional embodiment, when the target detection object is a face, the depth difference range may be set based on the distance difference between the nose tip and the ear in a depth direction.

Optionally, in order to save detection time, when the target detection object is a human face, the depth difference range may be set to 0 to 255 mm with the depth value accuracy of 1 mm, depending on the features of the face, e.g., the distance difference in the depth direction between the nose tip and the ears in the face is generally 255 mm.

Here, for the z-axis direction corresponding to the main optical axis of the image capturing device, the depth data of the pixel with the depth difference value close to 255 mm may be directly deleted, based on the main consideration that most of such depth data are very likely to be noise data, and the deletion of them not only does not affect the accuracy of the calculation but also save the time for subsequent calculations.

Step 1012, determining whether the angle of the extracted depth data on each coordinate plane of the three-dimensional coordinate system is within a preset angle range; if so, taking the extracted depth data as the valid depth data of the target detection object, otherwise, determining the extracted depth data as invalid depth data of the target detection object.

In the embodiment of the application, if the extracted depth data is determined as the invalid depth data of the target detection object, it is indicated that the extracted depth data cannot be used for the current living body detection, and the living body detection method ends.

Wherein the preset angle range is from −15° to +15°. The xy plane of the three-dimensional coordinate system is parallel to the plane where the sensor of the image capturing device for acquiring the depth map data is located, and the z-axis of the three-dimensional coordinate system is the main optical axis of the image capturing device. The coordinate planes of the three-dimensional coordinate system include an xy plane, an xz plane, and a yz plane. The angle of the depth data on the coordinate plane of the three-dimensional coordinate system can be understood as the angle between the plane directly facing the target detection object and the coordinate plane of the three-dimensional coordinate system.

In step 1012, it is considered that the accuracy of the living body detection is greatly reduced if the target detection object is not directly facing the image capturing device and the deflection angle is too large. In this case, the depth data, whose deflection angle is too large, is not considered for the living body detection, so as to improve the reliability of the detection result.

The following description will be given taking an example in which the target detection object is a human face.

Figure 3:
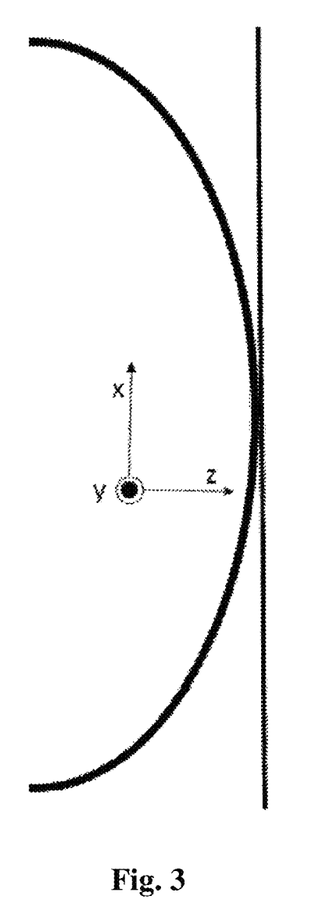
FIG. 3 is a schematic diagram of a top view of a paper photograph after bending.

When the device is attacked by non-human face props (such as planes of mobile phones or displayers, paper photographs, etc.), the difference between the acquired depth data and the depth data of a human face is very large. For example, when the authentication device is attacked by a bent paper photograph, the acquired depth data is as shown in FIG. 3. It can be seen from FIG. 3 that the depth data of a real human face is very different from the depth data of the bent paper photograph. Accordingly, the difference between the depth data of the real human face and the depth data of the image on a flat display device is more obvious. Therefore, the living body detection and determination based on the depth data can greatly improve the accuracy of detection.

Step 102, generating a depth difference histogram based on the valid depth data.

Optionally, in order to improve the efficiency of generating the depth difference histogram and ensure the accuracy of the living body detection, the following method may be used to generate the depth difference histogram in this step:

Step 1021, selecting the valid depth data in a preset sub-region from the valid depth data; wherein the preset sub-region is included in the region where the target detection object is located.

Optionally, in order to improve the detection efficiency, the following method may be adopted to select valid depth data in a preset sub-region from the valid depth data:

Firstly, according to a preset region block division rule, the region where the target detection object is located is divided into several region blocks.

The region block division rule may be the number of rows and columns of the region blocks included in the region where the target detection object is located.

Figure 4:
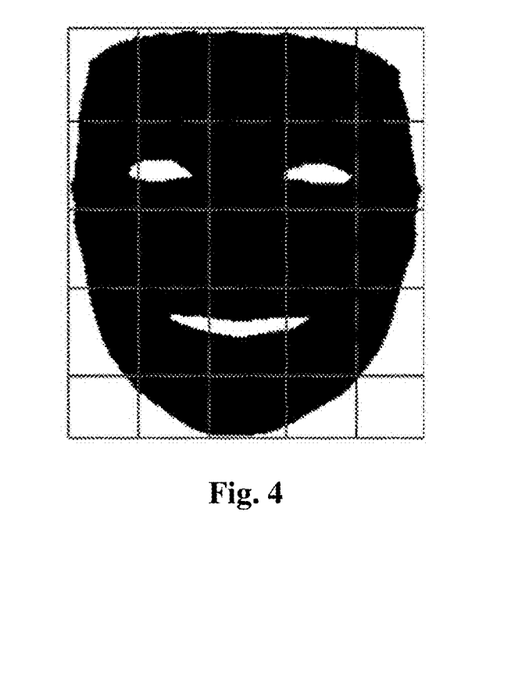
FIG. 4 is a schematic diagram of a normalized depth difference histogram according to an embodiment of the present application.

Here, in order to facilitate the accurate screening of depth data for living body detection, firstly, it is necessary to perform region block division on the region where a target detection object is located, and the specific region block division rule may be set by those skilled in the art according to actual needs. For example, when the target detection object is a human face, during the division of the face region into region blocks, the face region may be divided into 5×5 region blocks, as shown in FIG. 4, i.e., the face region may be divided into 25 region blocks.

Then, the valid depth data of all region blocks in the preset sub-region are extracted from the valid depth data of the region where the target detection object is located.

Optionally, the preset sub-region may be the whole region where the target detection object is located, or may be a part of the region where the target detection object is located, and its suitable region range can be specifically set by those skilled in the art. Optionally, when the target detection object is a human face, the calculation of the depth difference can be performed mainly on the nose, eyes, and the mouth, considering that the human face can be roughly divided into five regions, i.e., the forehead, eyes, a nose, a mouth and a chin from top to bottom, and the main distinguishing parts of living bodies and non-living bodies are concentrated on the nose, eyes, and mouth. In this case, the preset sub-region may be located in the middle of the region where the target detection object is located, as long as it can cover the nose, the eyes, and the mouth. As shown in FIG. 4, the preset sub-region is the region where the middle 3×3 region blocks are located.

Step 1022, calculating the depth difference from each pixel in the preset sub-region to the reference plane based on the selected valid depth data.

Wherein, the reference plane is a plane passing through the reference point and perpendicular to the main optical axis of the image capturing device for acquiring depth map data, and the reference point is a point in the target detection object closest to the image capturing device.

Step 1023, performing histogram statistics and then normalization processing based on the depth difference to obtain the depth difference histogram.

Figure 5:
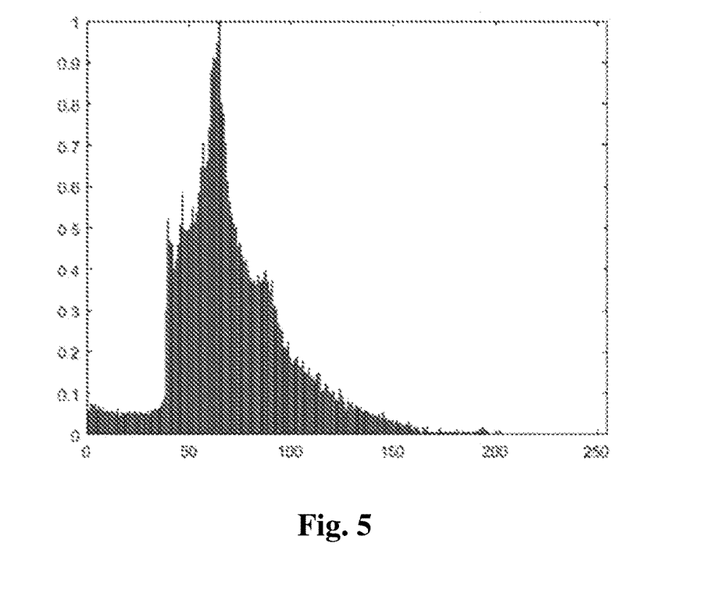
FIG. 5 is a schematic diagram illustrating the division of the frontal region of a face according to an embodiment of the present application.

In this step, histogram statistics is performed based on the depth difference from each pixel to the reference plane calculated in the previous step 1022, such as the horizontal line segment in FIG. 2, and finally normalization processing is performed on the histogram, that is, the depth difference of each bin (square bar) in the histogram is divided by the depth difference of the largest bin in the histogram. The depth difference histogram obtained after the normalization process is shown in FIG. 5.

Step 103, inputting the depth difference histogram into a pre-trained machine learning classifier to obtain a determination result of whether the target detection object is a living body.

Optionally, the machine learning classifier used in this step may be an SVM classifier, or may also be a neural network classifier including multiple hidden layers.

When the SVM classifier is adopted, the depth difference histogram of the positive and negative samples is used as a one-dimensional vector to generate the final SVM classifier by training. The final SVM classifier can be saved, and when the final SVM classifier is used, there is no need to train the final SVM classifier. The depth difference histogram of the positive sample is depth difference histogram of the living body, and the depth difference histogram of the negative sample is the depth difference histogram of the non-living body.

When a neural network classifier including multiple hidden layers, i.e., a neural network classifier trained by a deep learning algorithm, is adopted, the depth difference histogram of the positive and negative samples is input into a neural network model for training to obtain the neural network classifier. The depth difference histogram to be detected is inputted into the neural network classifier, i.e., the above neural network classifier that has been trained, so as to obtain a living body detection result and finish the living body detection.

It can be seen from the above method embodiments that in the living body detection method proposed in the embodiments of this application, living body detection is performed using machine learning training in combination with the depth information of the target detection object. On the one hand, living body images, photographs and images in videos (LCD/OLED displayers and mobile phones) can be validly distinguished, and the accuracy of the living body detection is improved. On the other hand, there is no need to calculate the curvature, which can greatly reduce the algorithm overhead and improve the efficiency of living body detection.

The embodiment of the present application further provides a living body detection device, including a processor configured for:

extracting valid depth data of a target detection object from depth map data containing the target detection object;

generating a depth difference histogram based on the valid depth data; and inputting the depth difference histogram into a pre-trained machine learning classifier to obtain a determination result of whether the target detection object is a living body.

Optionally, the processor may be specifically configured for:

extracting depth data of the target detection object from depth map data containing the target detection object in a manner of image segmentation according to a preset depth difference range;

determining whether the angle of the extracted depth data on each coordinate plane of a three-dimensional coordinate system is within a preset angle range; if so, taking the extracted depth data as the valid depth data of the target detection object; otherwise, determining the extracted depth data as invalid depth data of the target detection object;

wherein an xy plane of the three-dimensional coordinate system is parallel to a plane where a sensor of image capturing device for acquiring the depth map data is located, the z-axis of the three-dimensional coordinate system is the main optical axis of the image capturing device, and the image capturing device is arranged in the living body detection device or independently arranged outside the living body detection device.

Optionally, when the target detection object is a face, the depth difference range is a value range of a distance between a reference plane and a pixel in a region where the face is located in the depth map data; the reference plane is a plane perpendicular to the z-axis and passing through a reference point; when the face directly faces the image capturing device, the reference point is the nose tip of the face, and when the face does not directly face the image capturing device, the reference point is a point in the face closest to the image capturing device.

Optionally, the depth difference range is from 0 to 255 mm, the depth value accuracy is 1 mm, and the preset angle range is from $-15°$ to $+15°$.

Optionally, the processor may be specifically configured for:

selecting the valid depth data in a preset sub-region from the valid depth data of the target detection object; wherein the preset sub-region is included in the region where the target detection object is located;

calculating the depth difference from each pixel in the preset sub-region to a reference plane based on the selected valid depth data; wherein, the reference plane is a plane passing through a reference point and perpendicular to a main optical axis of an image capturing device for acquiring the depth map data, and the reference point is a point in the target detection object closest to the image capturing device;

performing histogram statistics and then normalization processing based on the depth difference to obtain the depth difference histogram.

Optionally, the processor may be specifically configured for:

dividing the region where the target detection object is located into several region blocks according to a preset region block division rule; and extracting valid depth data of all region blocks in a preset sub-region from the valid depth data of the target detection object.

Optionally, the preset sub-region is located in the middle of the region where the target detection object is located.

Optionally, the machine learning classifier is an SVM classifier or a neural network classifier including multiple hidden layers.

It can be seen from the above device embodiments that in the living body detection method proposed in the embodiments of the present application, living body detection is performed using machine learning training in combination with the depth information of the target detection object. On the one hand, living body images, photographs and images in videos (LCD/OLED displayers and mobile phones) can be validly distinguished, and the accuracy of the living body detection is improved. On the other hand, there is no need to calculate the curvature, which can greatly reduce the algorithm overhead and improve the efficiency of living body detection.

Further, the present application further discloses a non-transitory computer-readable storage medium, which stores instructions that, when executed by a processor, cause the processor to perform the steps of the living body detection method as described above.

The present application further discloses an electronic device, which includes the aforementioned non-transitory computer-readable storage medium, and a processor that can access the non-transitory computer-readable storage medium.

The present application further discloses a computer-executable instruction that, when executed by a processor, causes the processor to perform the steps of the living body detection method as described above.

In this context, relational terms such as first and second, and are only used to distinguish one entity or operation from another entity or operation without necessarily requiring or implying any actual such relationship or order between such entities or operation. Moreover, the terms "comprise", "include" or any other variation thereof are intended to cover a non-exclusive inclusion, so that a process, method, article, or device that comprises a series of elements does not include only those elements but may include other elements not expressly listed or inherent to such process, method, article, or device. Without further limitation, an element defined by the phrase "comprising" does not exclude the presence of other identical elements in the process, method, article, or device that comprises the element.

All the embodiments in the present specification are described in a related manner, and the same and similar parts among the embodiments may be referred to each other, and each embodiment focuses on the differences from other embodiments. In particular, for the embodiments of the living body detection device, the non-transitory computer-readable storage medium, the electronic device, and the computer-executable instructions, the description is relatively simple as they are substantially similar to the embodiments of the living body detection method, and for relevant points, reference may be made to the description of the embodiments of the living body detection method.

The above embodiments are only the preferred embodiments of the present application and are not intended to limit the present application, and any modification, equivalent replacement, improvement and the like made within the spirit and principle of the present application should be included in the protection scope of the present application.

In summary, the above embodiments are only the preferred embodiments of the present application, and are not intended to limit the protection scope of the present application. Any modification, equivalent replacement, or improvement etc. made within the spirit and principle of the present application should be included in the protection scope of the present application.

What is claimed is:

1. A living body detection method, comprising:
    extracting valid depth data of a target detection object from depth map data containing the target detection object;
    generating a depth difference histogram based on the valid depth data; and inputting the depth difference histogram into a pre-trained machine learning classifier to obtain a determination result of whether the target detection object is a living body;

wherein the step of extracting valid depth data of a target detection object from depth map data containing the target detection object comprises:

extracting depth data of the target detection object from the depth map data containing the target detection object in a manner of image segmentation according to a preset depth difference range;

determining whether an angle of the extracted depth data on each coordinate plane of a three-dimensional coordinate system is within a preset angle range; if this angle is within the preset angle range, taking the extracted depth data as the valid depth data of the target detection object; otherwise, determining the extracted depth data as invalid depth data of the target detection object;

wherein an xy plane of the three-dimensional coordinate system is parallel to a plane where a sensor of an image capturing device for acquiring the depth map data is located, and a z-axis of the three-dimensional coordinate system is a main optical axis of the image capturing device.

2. The method according to claim 1, wherein when the target detection object is a face, the depth difference range is a value range of a distance between a reference plane and a pixel in a region where the face is located in the depth map data; the reference plane is a plane perpendicular to the z-axis and passing through a reference point; when the face directly faces the image capturing device, the reference point is a nose tip of the face, and when the face does not directly face the image capturing device, the reference point is a point in the face closest to the image capturing device.

3. The method according to claim 2, wherein the depth difference range is from 0 to 255 mm, a depth value accuracy is 1 mm, and the preset angle range is from −15° to +15°.

4. The method according to claim 1, wherein the step of generating a depth difference histogram based on the valid depth data comprises:

selecting valid depth data in a preset sub-region from the valid depth data; wherein the preset sub-region is included in a region where the target detection object is located;

calculating a depth difference from each pixel in the preset sub-region to a reference plane based on the selected valid depth data; wherein, the reference plane is a plane passing through a reference point and perpendicular to a main optical axis of the image capturing device for acquiring the depth map data, and the reference point is a point in the target detection object closest to the image capturing device; and performing histogram statistics and then normalization processing based on the depth difference to obtain the depth difference histogram.

5. The method according to claim 4, wherein the step of selecting valid depth data in the preset sub-region from the valid depth data comprises:

dividing the region where the target detection object is located into several region blocks according to a preset region block division rule; and extracting valid depth data of all the region blocks in the preset sub-region from the valid depth data.

6. The method according to claim 4, wherein the preset sub-region is located in the middle of the region where the target detection object is located.

7. The method according to claim 1, wherein the machine learning classifier is a Support Vector Machine (SVM) classifier or a neural network classifier comprising multiple hidden layers.

8. A living body detection device, comprising a processor configured for:

extracting valid depth data of a target detection object from depth map data containing the target detection object;

generating a depth difference histogram based on the valid depth data; and inputting the depth difference histogram into a pre-trained machine learning classifier to obtain a determination result of whether the target detection object is a living body;

wherein the processor is specifically configured for:

extracting depth data of the target detection object from the depth map data containing the target detection object in a manner of image segmentation according to a preset depth difference range;

determining whether an angle of the extracted depth data on each coordinate plane of a three-dimensional coordinate system is within a preset angle range; if this angle is within the preset angle range, taking the extracted depth data as the valid depth data of the target detection object; otherwise, determining the extracted depth data as invalid depth data of the target detection object;

wherein an xy plane of the three-dimensional coordinate system is parallel to a plane where a sensor of an image capturing device for acquiring the depth map data is located, a z-axis of the three-dimensional coordinate system is a main optical axis of the image capturing device, and the image capturing device is arranged in the living body detection device or independently arranged outside the living body detection device.

9. The device according to claim 8, wherein when the target detection object is a face, the depth difference range is a value range of a distance between a reference plane and a pixel in a region where the face is located in the depth map data; the reference plane is a plane perpendicular to the z-axis and passing through a reference point; when the face directly faces the image capturing device, the reference point is a nose tip of the face, and when the face does not directly face the image capturing device, the reference point is a point in the face closest to the image capturing device.

10. The device according to claim 9, wherein the depth difference range is from 0 to 255 mm, a depth value accuracy is 1 mm, and the preset angle range is from −15° to +15°.

11. The device according to claim 8, wherein the processor is specifically configured for:

selecting valid depth data in a preset sub-region from the valid depth data; wherein the preset sub-region is included in a region where the target detection object is located;

calculating a depth difference from each pixel in the preset sub-region to a reference plane based on the selected valid depth data; wherein, the reference plane is a plane passing through a reference point and perpendicular to a main optical axis of the image capturing device for acquiring the depth map data, and the reference point is a point in the target detection object closest to the image capturing device; and performing histogram statistics and then normalization processing based on the depth difference to obtain the depth difference histogram.

12. The device according to claim 11, wherein the processor is specifically configured for:
dividing the region where the target detection object is located into several region blocks according to a preset region block division rule; and
extracting valid depth data of all the region blocks in the preset sub-region from the valid depth data.

13. The device according to claim 12, wherein the preset sub-region is located in the middle of the region where the target detection object is located.

14. The device according to claim 8, wherein the machine learning classifier is a Support Vector Machine (SVM) classifier or a neural network classifier comprising multiple hidden layers.

15. An electronic device comprising the non-transitory computer-readable storage medium having stored thereon instructions that, when executed by a processor, cause the processor to perform a living body detection method, and the processor that can access the non-transitory computer-readable storage medium;

wherein the living body detection method comprises:
extracting valid depth data of a target detection object from depth map data containing the target detection object;
generating a depth difference histogram based on the valid depth data; and
inputting the depth difference histogram into a pre-trained machine learning classifier to obtain a determination result of whether the target detection object is a living body;
wherein the step of extracting valid depth data of a target detection object from depth map data containing the target detection object comprises:
extracting depth data of the target detection object from the depth map data containing the target detection object in a manner of image segmentation according to a preset depth difference range;
determining whether an angle of the extracted depth data on each coordinate plane of a three-dimensional coordinate system is within a preset angle range; if this angle is within the preset angle range, taking the extracted depth data as the valid depth data of the target detection object; otherwise, determining the extracted depth data as invalid depth data of the target detection object;
wherein an xy plane of the three-dimensional coordinate system is parallel to a plane where a sensor of an image capturing device for acquiring the depth map data is located, and a z-axis of the three-dimensional coordinate system is a main optical axis of the image capturing device.

* * * * *